US012770383B2

(12) United States Patent
Cho et al.

(10) Patent No.: US 12,770,383 B2
(45) Date of Patent: Oct. 20, 2026

(54) ELECTRONIC APPARATUS FOR IDENTIFYING A REGION OF INTEREST IN AN IMAGE AND CONTROL METHOD THEREOF

(71) Applicant: SAMSUNG ELECTRONICS CO., LTD., Suwon-si (KR)

(72) Inventors: Ilhyun Cho, Suwon-si (KR); Wookhyung Kim, Suwon-si (KR); Jayoon Koo, Suwon-si (KR); Namuk Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 205 days.

(21) Appl. No.: 18/367,193

(22) Filed: Sep. 12, 2023

(65) Prior Publication Data

US 2024/0135697 A1 Apr. 25, 2024
US 2024/0233356 A9 Jul. 11, 2024

Related U.S. Application Data

(63) Continuation of application No. PCT/KR2023/011051, filed on Jul. 28, 2023.

(30) Foreign Application Priority Data

Oct. 21, 2022 (KR) ........................ 10-2022-0136326

(51) Int. Cl.
*G06V 10/82* (2022.01)
*G06T 3/40* (2024.01)

(52) U.S. Cl.
CPC ................ *G06V 10/82* (2022.01); *G06T 3/40* (2013.01)

(58) Field of Classification Search
CPC ................................. G06V 10/82; G06T 3/40
See application file for complete search history.

(56) References Cited

U.S. PATENT DOCUMENTS 8,019,175 B2 9/2011 Lee et al.
10,217,195 B1 * 2/2019 Agrawal ................ G06T 7/194
(Continued)

FOREIGN PATENT DOCUMENTS

JP 2008-536211 A 9/2008
JP 2022-505115 A 1/2022
(Continued)

OTHER PUBLICATIONS

Zhang et al, CapSal: Leveraging Captioning to Boost Semantics for Salient Object Detection, 2019 (Year: 2019).*
(Continued)

*Primary Examiner* — Kevin Ky
(74) *Attorney, Agent, or Firm* — Sughrue Mion, PLLC

(57) ABSTRACT

An electronic apparatus includes a memory configured to store a neural network model including a first network and a second network. The electronic apparatus also includes at least one processor connected to the memory. The at least one processor is configured to obtain description information corresponding to a first image by inputting the first image to the first network, obtain a second image based on the description information, obtain a third image representing a region of interest of the first image by inputting the first image and the second image to the second network. The neural network model is a model trained based on a plurality of sample images, a plurality of sample description information corresponding to the plurality of sample images, and a sample region of interest of the plurality of sample images.

20 Claims, 16 Drawing Sheets

(56) References Cited

U.S. PATENT DOCUMENTS

| | | | | |
|---|---|---|---|---|
| 10,679,063 | B2 | 6/2020 | Cheng et al. | |
| 11,017,255 | B2 | 5/2021 | Lee | |
| 11,388,465 | B2 | 7/2022 | Park et al. | |
| 11,551,433 | B2 | 1/2023 | Lee | |
| 11,657,230 | B2 * | 5/2023 | Lee | G06T 7/10 382/103 |
| 11,825,033 | B2 | 11/2023 | Park et al. | |
| 2003/0137522 | A1 * | 7/2003 | Kaasila | G06T 3/4015 345/619 |
| 2006/0215753 | A1 | 9/2006 | Lee et al. | |
| 2007/0097268 | A1 * | 5/2007 | Relan | H04N 21/47205 348/576 |
| 2008/0201282 | A1 | 8/2008 | Garcia et al. | |
| 2013/0028514 | A1 * | 1/2013 | Kihira | G06F 16/986 382/167 |
| 2015/0254538 | A1 * | 9/2015 | Fukazawa | G06K 15/1878 358/1.9 |
| 2016/0225053 | A1 * | 8/2016 | Romley | G06T 7/143 |
| 2017/0295372 | A1 * | 10/2017 | Lawrence | H04N 19/182 |
| 2018/0211438 | A1 * | 7/2018 | Gonzalez Aguirre | G06T 17/00 |
| 2018/0247405 | A1 | 8/2018 | Kisilev et al. | |
| 2019/0042574 | A1 | 2/2019 | Kim et al. | |
| 2020/0053408 | A1 | 2/2020 | Park et al. | |
| 2020/0226410 | A1 * | 7/2020 | Liu | G06V 30/153 |
| 2021/0019890 | A1 * | 1/2021 | Chen | G06T 7/11 |
| 2021/0034905 | A1 | 2/2021 | Lee | |
| 2021/0166013 | A1 * | 6/2021 | Tensmeyer | G06V 30/2276 |
| 2021/0166345 | A1 * | 6/2021 | Kim | G06T 3/4053 |
| 2021/0241432 | A1 | 8/2021 | Li et al. | |
| 2021/0256365 | A1 | 8/2021 | Wang et al. | |
| 2021/0279495 | A1 | 9/2021 | Lee | |
| 2022/0007946 | A1 * | 1/2022 | Ziegle | A61B 8/08 |
| 2022/0030291 | A1 | 1/2022 | Park et al. | |
| 2022/0058332 | A1 | 2/2022 | Ke et al. | |
| 2023/0096682 | A1 * | 3/2023 | Chou | H04N 19/43 375/240.16 |
| 2023/0230198 | A1 * | 7/2023 | Zhang | G06N 3/08 382/276 |
| 2023/0274453 | A1 * | 8/2023 | Tang | G06T 7/521 348/42 |
| 2024/0040179 | A1 | 2/2024 | Park et al. | |
| 2024/0080462 | A1 * | 3/2024 | Park | H04N 19/59 |
| 2024/0153258 | A1 * | 5/2024 | Mangla | G06V 10/764 |
| 2024/0389961 | A1 * | 11/2024 | Lee | A61B 6/032 |
| 2025/0254329 | A1 * | 8/2025 | Zhang | H04N 19/147 |

FOREIGN PATENT DOCUMENTS

| | | | |
|---|---|---|---|
| KR | 10-0946813 | B1 | 3/2010 |
| KR | 10-1930940 | B1 | 12/2018 |
| KR | 10-2019-0013427 | A | 2/2019 |
| KR | 10-2019-0030151 | A | 3/2019 |
| KR | 10-2022648 | B1 | 9/2019 |
| KR | 10-2020-0062891 | A | 6/2020 |
| KR | 10-2199094 | B1 | 1/2021 |
| KR | 10-2022-0037617 | A | 3/2022 |

OTHER PUBLICATIONS

Communication issued on Apr. 22, 2025 by the European Patent Office in European Patent Application No. 23879964.7.

Lu Zhang et al., "CapSal: Leveraging Captioning to Boost Semantics for Salient Object Detection", 2019 IEEE/CVF Conference on Computer Vision and Pattern Recognition (CVPR), Jun. 2019, pp. 6017-6026, DOI: 10.1109/CVPR.2019.00618, XP033687571.

Tengfei Xing et al., "Text to Region: Visual-Word Guided Saliency Detection", Advances in Multimedia Information Processing—PCM 2018, Sep. 2018, pp. 740-749, DOI: 10.1007/978-3-030-00764-5_68, XP047686275.

Vasili Ramanishka et al., "Top-Down Visual Saliency Guided by Captions", 2017 IEEE Conference on Computer Vision and Pattern Recognition (CVPR), Jul. 2017, pp. 3135-3144, DOI: 10.1109/CVPR.2017.334, XP033249660.

International Search Report and Written Opinion (PCT/ISA/210 and PCT/ISA/237) dated Nov. 27, 2023, issued by International Searching Authority in International Application No. PCT/KR2023/011051.

Shen Yang et al., "A Dilated Inception Network for Visual Saliency Prediction", IEEE Transactions on Multimedia, arXiv:1904.03571v2 [cs.CV], May 9, 2019, 14 pages.

Xiongkuo Min et al., "A Multimodal Saliency Model for Videos With High Audio-Visual Correspondence", IEEE Transactions on Image Processing, vol. 29, 2020, 15 pages.

Extended European Search Report dated Apr. 1, 2026, issued by the European Patent Office in European Application No. 23879964.7.

Office Action issued Aug. 7, 2026 by the Korean Patent Office for Korean Patent Application No. 10-2022-0136326.

* cited by examiner

ELECTRONIC APPARATUS FOR IDENTIFYING A REGION OF INTEREST IN AN IMAGE AND CONTROL METHOD THEREOF

CROSS REFERENCE TO RELATED APPLICATIONS

This application is a continuation of PCT/KR2023/011051 filed Jul. 28, 2023 in the Korean Intellectual Property Office (KIPO) and claims benefit of priority to KR Patent Application No. 10-2022-0136326 filed on Oct. 21, 2022 in KIPO. The above applications are incorporated by reference herein.

BACKGROUND

1. Field

The disclosure relates to an electronic apparatus and a control method of the electronic apparatus, and more particularly to an electronic apparatus that identifies a region of interest in an image and a control method of the region of interest.

2. Description of Related Art

With developments in electronic technology, electronic apparatuses that provide various functions are being developed. Recently, in the field of displays, screens are actively becoming large-scaled. Demands for a large-scaled screen are increasing in not only home TV markets, but also in an outdoor industrial/advertisement display (large format display (LFD) and LED signage) market.

Problems such as carbon discharge may occur due to power consumption increasing as screen sizes increase. Recently, leading countries are providing regulations for carbon discharge demanding of an environmental, social and corporate governance (ESG) management to companies. Under such circumstances, there is a need for display devices to also effectively consume power.

As a method for raising power consumption efficiency, for example, display devices may reduce power consumption while minimizing cognitive degradation of image quality by lowering brightness of a background region which is a remaining region excluding a region of interest of content. That is, there is a need to sufficiently distinguish the region of interest and the background region from the content.

SUMMARY

Provided herein is an electronic apparatus, including: a memory configured to store a neural network model including a first network and a second network, wherein the neural network model includes weights; and at least one processor connected to the memory and configured to control the electronic apparatus, wherein the at least one processor is configured to: obtain first description information corresponding to a first image by inputting the first image to the first network using the weights, obtain a second image based on the first description information, and obtain a third image representing a first region of interest of the first image by inputting the first image and the second image to the second network using the weights, wherein the weights of the neural network model are trained based on: i) a plurality of sample images, ii) a plurality of sample description information corresponding to the plurality of sample images, and iii) a sample region of interest for each sample image of the plurality of sample images.

In some embodiments, the at least one processor is further configured to: obtain the third image by inputting the first image to an input layer of the second network using the weights, and input the second image to an intermediate layer of the second network using the weights.

In some embodiments, the first description information includes at least one word and the at least one processor is further configured to obtain the second image by converting each word of the at least one word to a corresponding color.

In some embodiments, the at least one processor is further configured to: obtain the first image by downscaling an original image to a pre-set resolution, or downscale the original image to a pre-set scaling rate.

In some embodiments, the at least one processor is further configured to upscale the third image to correspond to a resolution of the original image.

In some embodiments, the third image depicts the first region of interest of the first image in a first color, and the third image depicts a background region in a second color, wherein the background region is a remaining region excluding the first region of interest of the first image, and a resolution of the third image is the same as that of the first image.

In some embodiments, the first network is configured so as to be trained of a first relationship of the plurality of sample description information for the plurality of sample images through an artificial intelligence algorithm, and the second network is configured so as to be trained, through the artificial intelligence algorithm, of a second relationship of the plurality of sample images and the sample region of interest for the each sample image of the plurality of sample images, wherein each sample image corresponds to a sample description information of the plurality of sample description information.

In some embodiments, the first network and the second network are simultaneously trained.

In some embodiments, the first network includes a convolution network and a plurality of long short-term memory networks (LSTMs), and the plurality of LSTMs are configured to output the first description information.

In some embodiments, the at least one processor is further configured to: identify a remaining region excluding the first region of interest from the first image as a background region, and image process the first region of interest and the background region differently.

Also provided herein is a control method of an electronic apparatus, the control method including: obtaining first description information corresponding to a first image by inputting the first image to a first network comprised in a neural network model; obtaining a second image based on the first description information; and obtaining a third image showing a region of interest of the first image by inputting the first image and the second image to a second network comprised in the neural network model; and wherein the neural network model is a model trained based on a plurality of sample images, a plurality of sample description information corresponding to the plurality of sample images, and a sample region of interest for each sample image of the plurality of sample images.

In some embodiments, the obtaining the third image includes obtaining the third image by inputting the first image in an input layer of the second network, and inputting the second image to an intermediate layer of the second network.

In some embodiments, the first description information includes at least one word, and the obtaining the second image includes obtaining the second image by converting each word of the at least one word to a corresponding color.

In some embodiments, the control method includes obtaining the first image by downscaling an original image to a pre-set resolution, or downscaling the original image to a pre-set scaling rate.

In some embodiments, the control method includes upscaling the third image to correspond to a resolution of the original image.

In some embodiments, the pre-set resolution is 320 by 240.

In some embodiments, the downscaling is configured to reduce a power consumption by using the first image, wherein the first image is of low resolution.

In some embodiments, the downscaling maintains a horizontal width of the original image and a vertical height of the original image.

In some embodiments, the resolution of the first image is a first resolution of 320 by 240 after the downscaling, and the third image has a full high definition (FHD) resolution after the upscaling, wherein the original image has an FHD resolution.

In some embodiments, the at least one processor is further configured to: read the weights of the neural network model from the memory; and implement the first network and the second network in the at least one processor using the weights.

DETAILED DESCRIPTION

Figure 1A:
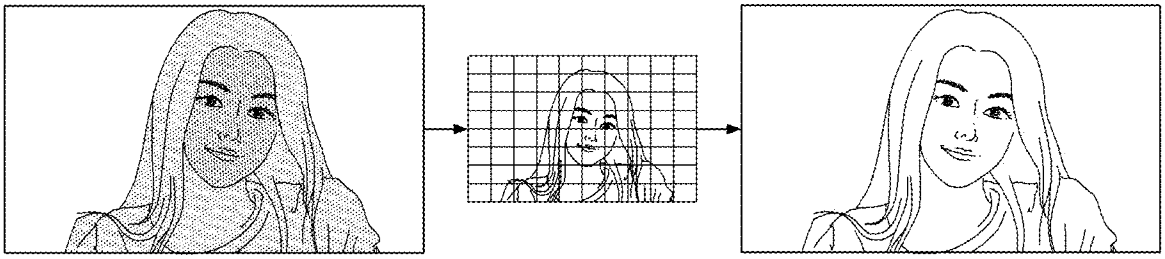
FIG. 1A to FIG. 1F are diagrams illustrating a method of identifying a region of interest to assist in the understanding of the disclosure.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

An object of the disclosure is in providing an electronic apparatus that more effectively identifies a region of interest from one image and a control method thereof.

The disclosure will be described in detail below with reference to the accompanying drawings.

Terms used in describing one or more embodiments of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," "may include," or the like are used to designate a presence of a corresponding characteristic (e.g., elements such as numerical value, function, operation, or component), and not to preclude a presence or a possibility of additional characteristics.

The expression at least one of A and/or B is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the term "user" may refer to a person using an electronic apparatus or a device (e.g., artificial intelligence electronic apparatus) using an electronic device.

The various embodiments of the disclosure will be described in greater detail below with reference to the accompanied drawings.

FIG. 1A to FIG. 1F are diagrams illustrating a method of identifying a region of interest to assist in the understanding of the disclosure.

Recently, technology of various methods is being developed to realize a resolution that can raise a sense of immersion. For example, as shown in FIG. 1A, if a user views content, a more immersive and stereoscopic image quality experience may be provided to the user when the region of interest (saliency), which is a region that is most focused and viewed, is detected, and an image quality of the region of interested is enhanced.

Figure 1B:
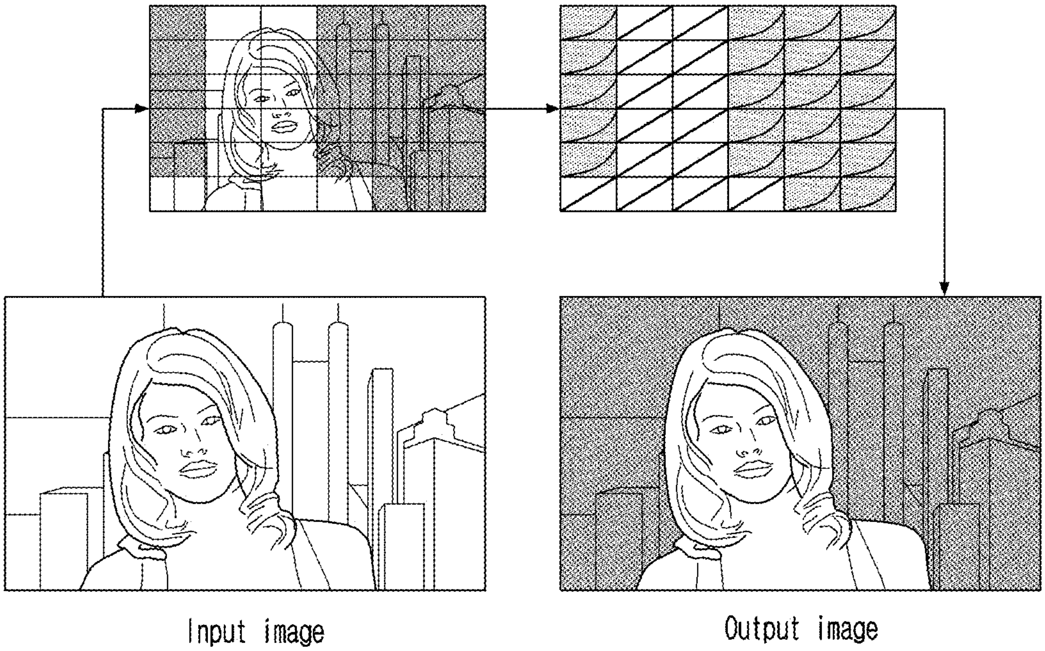

In addition, recently, there is a rising need to improve power consumption of display devices as a part of ESG management, and to this end, a method of lowering power consumption without cognitive degradation of image quality by lowering brightness of a non-region of interest (a background region) and not the region of interest is being used as shown in FIG. 1B.

Taking into consideration the above, detecting the region of interest is important for realizing an immersive image quality and improving efficient power consumption, and there is a need to raise detection accuracy.

One method from among the methods of detecting the region of interest is a method of finding a region with a feature which can be focused on by the user by analyzing feature information of an image within a single image. For example, the region of interest may be detected through image processing such as, for example, and without limitation, histogram, frequency domain analysis, and the like.

Figure 1C:
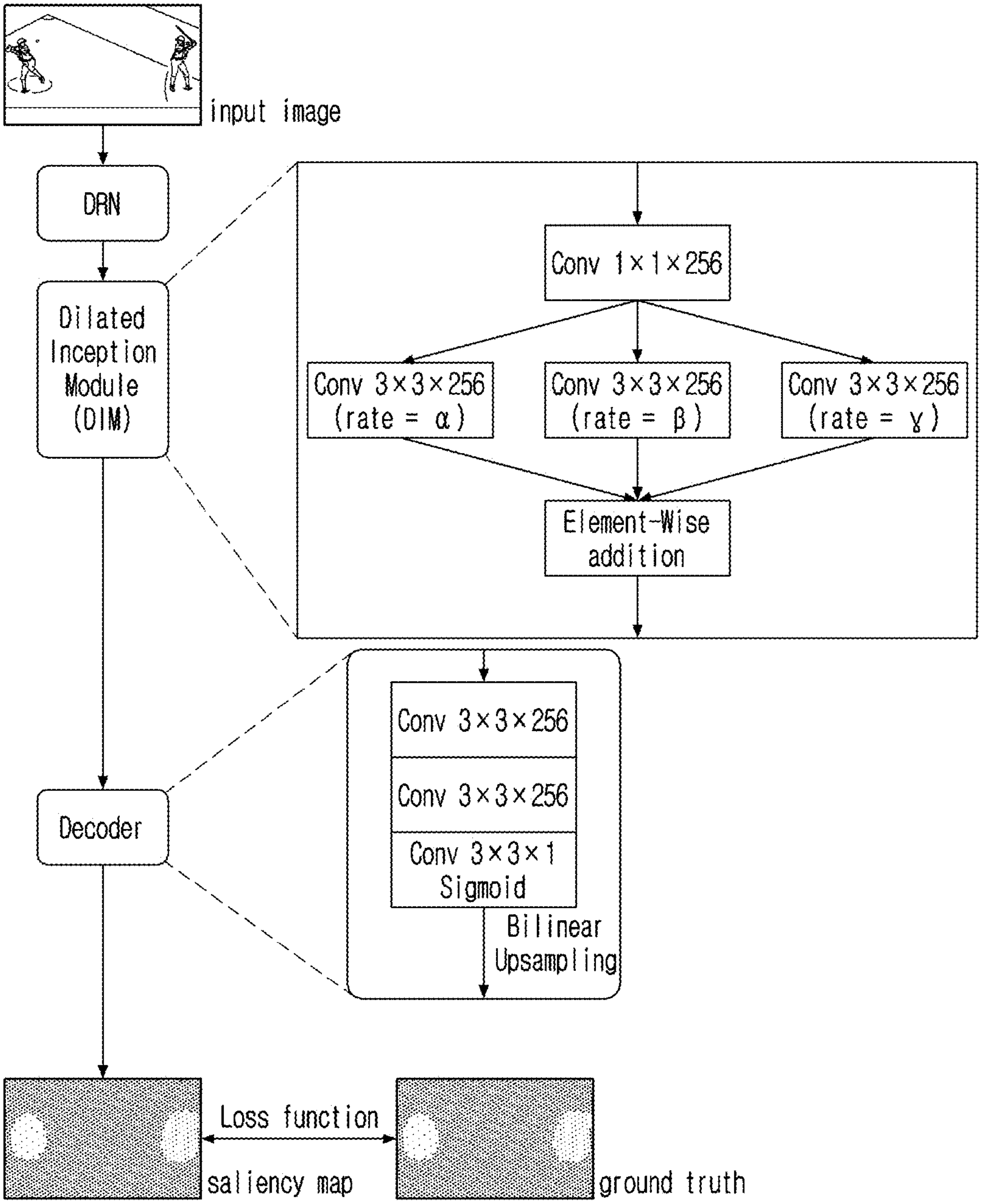

Alternatively, as shown in FIG. 1C, the region of interest may be detected through an artificial intelligence (AI) based method utilizing deep learning.

Figure 1D:
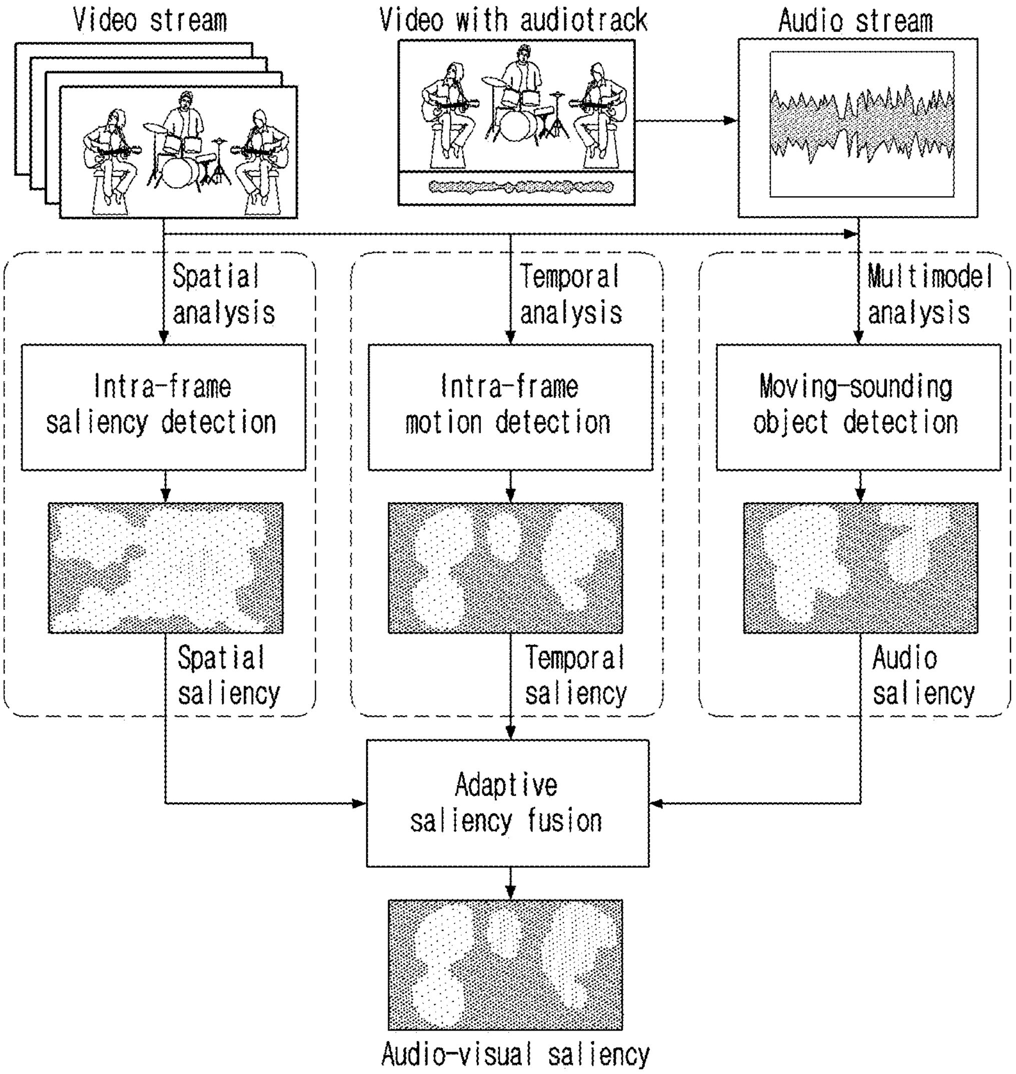
Figure 1E:
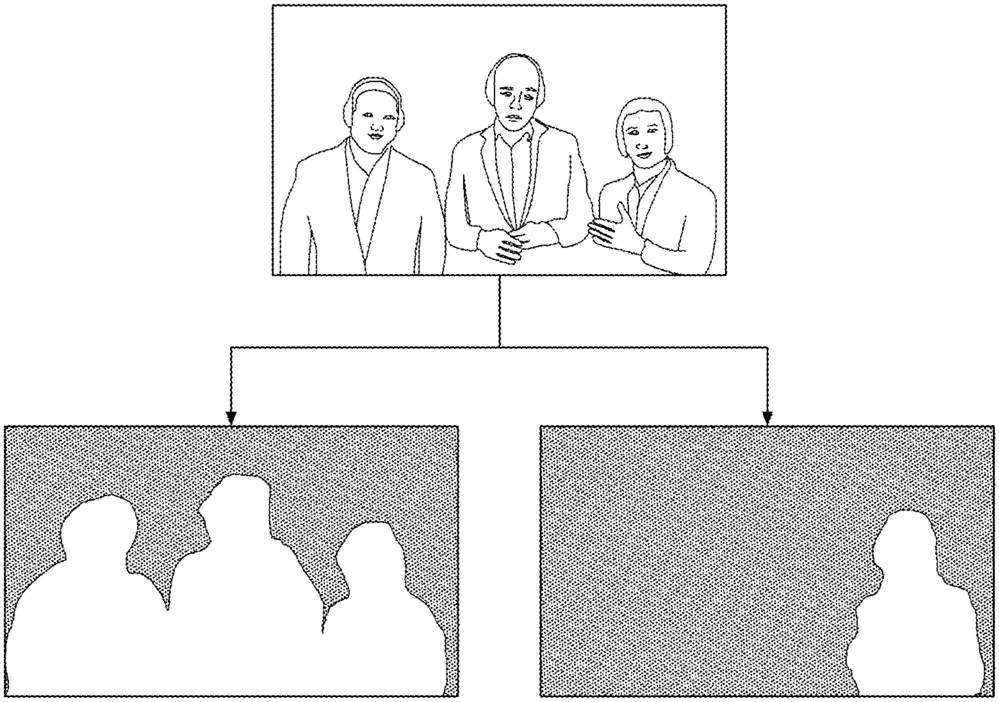

Alternatively, to enhance detection performance, the region of interest may be detected through a multimodal method that collects and uses feature information of a single image, stream (motion) information obtained from a plurality of images, voice information, and the like as shown in FIG. 1D. In FIG. 1D, the two dimensional information labelled as spatial saliency is an example of a second image as described with respect to FIG. 5 and the output of the text-to-image encoder 540-1. The corresponding text description is not illustrated in FIG. 1D.

When only the feature information of the single image is used, there is a problem of detection accuracy being relatively low. For example, if a speaker is a person on the right side from among three people as shown at the upper end of FIG. 1E, the region of interest may be identified as in the left lower end of FIG. 1E if only the feature information of the single image is used, but if voice information is further used, the region of interest may be identified as in the right lower end of FIG. 1E. That is, performance may be relatively lower when using only the feature information of the single image than when additionally using voice information.

Figure 1F:
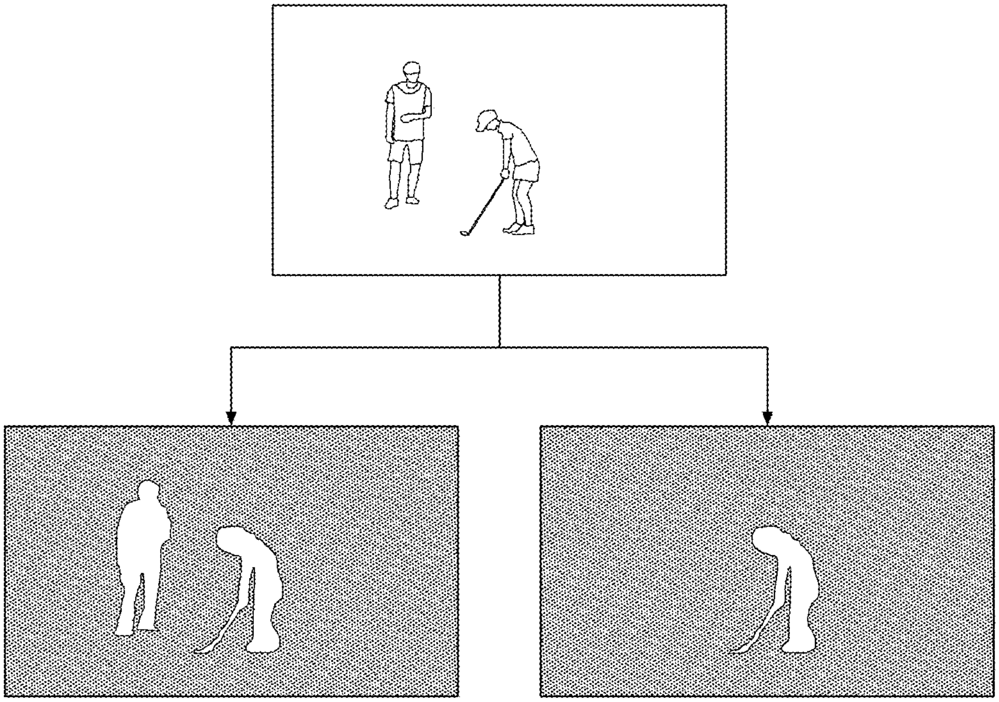

Alternatively, for example, if a person on the right side from among two people is playing golf as in the upper end of FIG. 1F, the region of interest may be identified as in the left lower end of FIG. 1F if only the feature information of the single image is used, but the region of interest may be identified as in the right lower end of FIG. 1F if motion information is additionally used. That is, performance may be relatively lower when using only the feature information of the single image than when additionally using motion information.

As described above, the multimodal method may raise detection accuracy, but requires an additional device for information extraction. For example, in order to use voice information, a device separating a voice signal from an image is required, and in order to use stream information, a device that compares a memory for storing a plurality of images and extracts information such as motion is required. In addition, an integration device that compares/analyzes information with one another and finally outputs in one form is required. Ultimately, detection time may be increased than when using only the single image due to cost for the additional device and amount of computation increasing.

Figure 2:
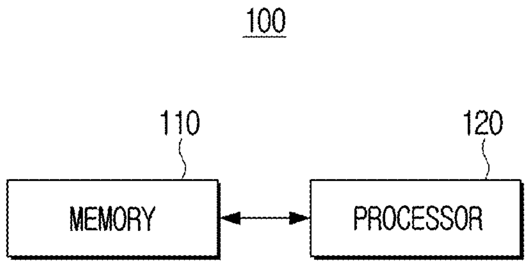
FIG. 2 is a block diagram illustrating a configuration of an electronic apparatus according to one or more embodiments of the disclosure.

FIG. 2 is a block diagram illustrating a configuration of an electronic apparatus 100 according to one or more embodiments of the disclosure.

The electronic apparatus 100 may identify a region of interest from an image. For example, the electronic apparatus 100 may be an apparatus that identifies the region of interest from the image such as, for example, and without limitation, a main body of a computer, a set-top box (STB), a server, an AI speaker, and the like. Specifically, the electronic apparatus 100 may include a display such as, for example, and without limitation, a television (TV), a desktop personal computer (PC), a notebook, a smartphone, a tablet PC, a pair of smart glasses, a smart watch, and the like, and may be an apparatus that identifies a region of interest from a displayed image.

Referring to FIG. 2, the electronic apparatus 100 may include a memory 110 and a processor 120.

The memory 110 may refer to a hardware that stores information such as data in electric or magnetic form for the processor 120 and the like to access. To this end, the memory 110 may be realized as at least one hardware from among a non-volatile memory, a volatile memory, a flash memory, a hard disk drive (HDD) or a solid state drive (SSD), a random access memory (RAM), a read only memory (ROM), and the like.

In the memory 110, at least one instruction required in an operation of the electronic apparatus 100 or the processor 120 may be stored. Here, the instruction may be a code unit that instructs an operation of the electronic apparatus 100 or the processor 120, and may be prepared in a machine language which is a language that can be understood by a computer. Alternatively, the memory 110 may be stored with a plurality of instructions that perform a specific work of the electronic apparatus 100 or the processor 120 as an instruction set.

The memory 110 may be stored with data which is information in a bit or byte unit that can represent a character, a number, an image, and the like. For example, the memory 110 may be stored with a neural network model, and the like. Here, the neural network model may include a first network and a second network, and may be a model trained based on a plurality of sample images, a plurality of sample description information corresponding to the plurality of sample images, and a sample region of interest of the plurality of sample images.

The memory 110 may be accessed by the processor 120 and reading, writing, modifying, deleting, updating, and the like of the instruction, the instruction set, or data may be performed by the processor 120.

The processor 120 may control the overall operation of the electronic apparatus 100. Specifically, the processor 120 may control the overall operation of the electronic apparatus 100 by being connected with each configuration of the electronic apparatus 100. For example, the processor 120 may be connected with configurations such as the memory 110, a display (not shown), a communication interface (not shown), and the like and control an operation of the electronic apparatus 100.

At least one processor 120 may include at least one from among a central processing unit (CPU), a graphics processing unit (GPU), an accelerated processing unit (APU), a many integrated core (MIC), a neural processing unit (NPU), a hardware accelerator, or a machine learning accelerator. The at least one processor 120 may control one or a random combination from among other elements of the electronic apparatus 100, and perform an operation associated with communication or data processing. The at least one processor 120 may execute at least one program or instruction stored in the memory. For example, the at least one processor 120 may perform, by executing at least one instruction stored in the memory, a method according to one or more embodiments of the disclosure.

If a method according to one or more embodiments of the disclosure includes a plurality of operations, the plurality of operations may be performed by one processor, or performed by a plurality of processors. For example, when a first operation, a second operation, and a third operation are performed by a method according to one or more embodiments, the first operation, the second operation, and the third operation may all be performed by a first processor, or the first operation and the second operation may be performed by the first processor (e.g., a generic-purpose processor) and the third operation may be performed by a second processor (e.g., an artificial intelligence dedicated processor).

The at least one processor 120 may be realized as a single core processor that includes one core, or as at least one multicore processor that includes a plurality of cores (e.g., a homogeneous multicore or a heterogeneous multicore). If the at least one processor 120 is realized as a multicore processor, each of the plurality of cores included in the multicore processor may include a memory inside the processor such as a cache memory and an on-chip memory, and a common cache shared by the plurality of cores may be included in the multicore processor. In addition, each of the plurality of cores (or a portion from among the plurality of cores) included in the multicore processor may independently read and perform a program command for realizing a method according to one or more embodiments, or read and perform a program command for realizing a method according to one or more embodiments of the disclosure due to a whole (or a portion) of the plurality of cores being interconnected.

When a method according to one or more embodiments of the disclosure includes a plurality of operations, the plurality of operations may be performed by one core from among the plurality of cores, or performed by the plurality of cores included in the multicore processor. For example, when a first operation, a second operation, and a third operation are performed by a method according to one or more embodiments, the first operation, the second operation, and the third operation may all be performed by a first core included in the multicore processor, or the first operation and the second operation may be performed by the first core included in the multicore processor and the third operation may be performed by a second core included in the multicore processor.

According to one or more embodiments, the at least one processor 120 may refer to a system on chip (SoC), a single core processor, or a multicore processor in which the at least one processor and other electronic components are integrated or a core included in the single core processor or the multicore processor, and the core herein may be realized as the CPU, the GPU, the APU, the MIC, the NPU, the hardware accelerator, the machine learning accelerator, or the like, but is not limited to the one or more embodiments of the disclosure. However, for convenience of description, an operation of the electronic apparatus 100 will be described below using the expression 'processor 120.'

The processor 120 may obtain description information corresponding to a first image by inputting the first image to the first network included in the neural network model. Here, the description information may include at least one word. For example, the processor 120 may input the first image in the first network included in the neural network model and obtain description information corresponding to the first image such as "The first person on the left is speaking among two people." Here, the first image may be an image directly displayed by the electronic apparatus 100 or an image corresponding to screen data provided by the electronic apparatus 100 to the display device.

However, the above is not limited thereto, and the description information may include various languages.

The processor 120 may obtain a second image based on the description information. For example, if the description information includes at least one word, the processor 120 may obtain the second image by converting each of the at least one word to a corresponding color. In an example, the processor 120 may obtain the second image including color information of eleven colors by converting each word of "The first person on the left is speaking among two people." to the corresponding color.

The processor 120 may obtain a third image representing the region of interest of the first image by inputting the first image and the second image to the second network included in the neural network model. Here, the third image may represent the region of interest of the first image in a first color, and represent the background region, which is a remaining region excluding the region of interest of the first image, in a second color, and the resolution of which may be same as the first image. In an example, the region of interest in the third image may be shown in a white color, and the background region which is the remaining region excluding the region of interest may be shown in a black color.

The neural network model may be a model trained based on a plurality of sample images, a plurality of sample description information corresponding to the plurality of sample images, and a sample region of interest of the plurality of sample images. For example, the first network may be configured such that a relationship of the plurality of sample description information for the plurality of sample images is learned through an artificial intelligence algorithm, and the second network may be configured such that a relationship of the sample region of interest of the plurality of sample images for the plurality of sample images and the plurality of sample description information may be trained through the artificial intelligence algorithm. In addition, the first network and the second network may be simultaneously trained.

The processor 120 may input the first image to an input layer of the second network, and obtain the third image by inputting the second image to an intermediate layer of the second network. However, the above is not limited thereto, and the neural network model may be trained to obtain the third image by inputting the first image and the second image to the input layer of the second network.

The processor 120 may obtain the first image by downscaling an original image to a pre-set resolution or downscaling the original image to a pre-set scaling rate. For example, the processor 120 may obtain the first image by downscaling the original image to a 320×240 resolution. Because the operation of identifying the region of interest may use any image of low resolution, power consumption may be reduced by reducing an amount of computation through operations such as the above.

However, the above is not limited thereto, and the processor 120 may down scale the original image while maintaining a horizontal and vertical width of the original image.

The processor 120 may upscale for the third image to correspond to the resolution of the original image. For example, if the original image has a FHD resolution, and the first image downscaled to 320×240 resolution is obtained from the original image, the third image may also be a 320×240 resolution. FHD (full high definition) resolution is 1920 by 1080 pixels. In this case, the processor 120 may upscale the third image of 320×240 resolution to the FHD resolution.

The first network may include a convolution network and a plurality of long short-term memories (LSTM), and the plurality of LSTM may output description information. For example, each of the plurality of LSTM may output one word. In this case, the processor 120 may obtain one sentence based on a plurality of words output from the plurality of LSTM. Alternatively, each of the plurality of LSTM may output a word, but the neural network model may be trained to output a word sequentially to form a sentence.

The processor 120 may identify the remaining region excluding the region of interest from the first image as the background region, and image process the region of interest and the background region differently. For example, the processor 120 may maintain the brightness of the region of interest and lower the brightness of the background region and thereby, reduce power consumption while minimizing cognitive degradation of image quality.

A function associated with artificial intelligence according to the disclosure may be operated through the processor 120 and the memory 110.

The processor 130 may be configured of one or a plurality of processors. The one or plurality of processors may be a generic-purpose processor such as a central processing unit (CPU), an application processor (AP), or a digital signal processor (DSP), a graphics dedicated processor such as a graphic processing unit (GPU) or a vision processing unit (VPU), or an artificial intelligence dedicated processor such as an neural processing unit (NPU).

The one or plurality of processors may control for the input data to be processed according to a pre-defined operation rule or an artificial intelligence model stored in the memory 110. Alternatively, if the one or plurality of processors is an artificial intelligence dedicated processor, the artificial intelligence dedicated processor may be designed to a hardware structure specializing in the processing of a specific artificial intelligence model. The pre-defined operation rule or the artificial intelligence model is characterized by structure created through learning.

The structure created through learning referred to herein refers to the pre-defined operation rule or artificial intelligence model set to perform a desired feature (or, purpose) and is created as a basic artificial intelligence model trained by a learning algorithm using a plurality of learning data. The learning may be carried out in a machine itself in which the artificial intelligence according to the disclosure is performed, or carried out through a separate server and/or system. Examples of the learning algorithm may include a supervised learning, a unsupervised learning, a semi-supervised learning, or a reinforcement learning, but is not limited to the above-described examples.

The artificial intelligence model may be formed of a plurality of neural network layers. Each of the plurality of neural network layers may include a plurality of weight values (also referred to as weights), and perform a neural network computation through computation between a computation result of a previous layer and the plurality of weight values. The plurality of weight values included in the plurality of neural network layers may be optimized by a learning result of the artificial intelligence model. For example, the plurality of weight values may be updated for a loss value or a cost value obtained by the artificial intelligence model during the learning process to be reduced or minimized. In some embodiments, processor 120 is configured to: obtain the third image by inputting the first image to an input layer of the second network using the weights, and input the second image to an intermediate layer of the second network using the weights.

The artificial neural network may include a Deep Neural Network (DNN), and examples thereof may include a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep-Q Networks, or the like, but is not limited thereto.

Figure 3:
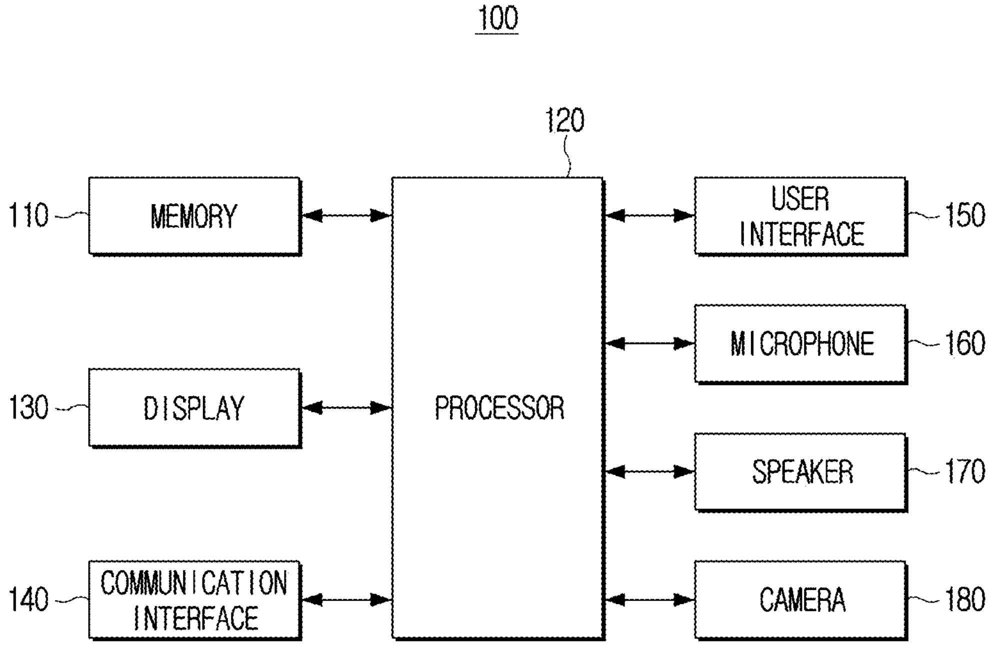
FIG. 3 is a block diagram illustrating a detailed configuration of an electronic apparatus according to one or more embodiments of the disclosure.

FIG. 3 is a block diagram illustrating a detailed configuration of the electronic apparatus 100 according to one or more embodiments of the disclosure.

The electronic apparatus 100 may include the memory 110 and the processor 120. In addition, referring to FIG. 3, the electronic apparatus 100 may further include a display 130, a communication interface 140, a user interface 150, a microphone 160, a speaker 170, and a camera 180. Detailed description of parts that overlap with the elements shown in FIG. 2 from among the elements shown in FIG. 3 will be omitted.

The display 130 may be a configuration that displays an image, and realized as a display of various forms such as a liquid crystal display (LCD), an organic light emitting diode (OLED) display, and a plasma display panel (PDP). In the display 130, a driving circuit, which may be realized in the form of an a-si TFT, a low temperature poly silicon (LTPS) TFT, an organic TFT (OTFT), or the like, a backlight unit, and the like may be included. The display 130 may be realized as a touch screen coupled with a touch sensor, a flexible display, a three-dimensional display (3D display), or the like.

The communication interface 140 may be a configuration that performs communication with external devices of various types according to communication methods of various types. For example, the electronic apparatus 100 may perform communication with a content server or a user terminal device through the communication interface 140.

The communication interface 140 may include a Wi-Fi module, a Bluetooth module, an infrared communication module, a wireless communication module, and the like. Here, each communication module may be realized in at least one hardware chip form.

The Wi-Fi module and the Bluetooth module may perform communication in a Wi-Fi method and a Bluetooth method, respectively. When using the Wi-Fi module or the Bluetooth module, various joining information such as a service set identifier (SSID) and a session key may first be transmitted and received, and after communicatively joining using the same, various information may be transmitted and received. The infrared communication module may perform communication according to an infrared communication (Infrared Data Association (IrDA)) technology of transmitting data wirelessly in short range by using infrared rays present between visible rays and millimeter waves.

The wireless communication module may include at least one communication chip that performs communication according to various wireless communication standards such as, for example, and without limitation, ZigBee, 3rd Generation (3G), 3rd Generation Partnership Project (3GPP), Long Term Evolution (LTE), LTE Advanced (LTE-A), 4th Generation (4G), 5th Generation (5G), and the like, in addition to the above-described communication methods.

Alternatively, the communication interface 140 may include a wired communication interface such as, for example, and without limitation, HDMI, DP, Thunderbolt, USB, RGB, D-SUB, DVI, and the like.

In addition thereto, the communication interface 140 may include at least one from among the wired communication modules that perform communication using the local area network (LAN) module, the Ethernet module, or the pair cable, the coaxial cable or the optical fiber cable, or the like.

The user interface 150 may be realized with a button, a touch pad, a mouse and a keyboard, or realized also as a touch screen capable of performing a display function and an operation input function together therewith. Here, the button may be a button of various types such as a mechanical button, a touch pad, or a wheel which is formed at a random area at a front surface part or a side surface part, a rear surface part, or the like of an exterior of a main body of the electronic apparatus 100.

The microphone 160 may be a configuration for receiving sound and converting to an audio signal. The microphone 160 may be electrically connected with the processor 120, and may receive sound by the control of the processor 120.

For example, the microphone 160 may be formed as an integrated-type integrated to an upper side or a front surface direction, a side surface direction or the like of the electronic apparatus 100. Alternatively, the microphone 160 may be provided in a remote controller, or the like separate from the electronic apparatus 100. In this case, the remote controller may receive sound through the microphone 160, and provide the received sound to the electronic apparatus 100.

The microphone 160 may include various configurations such as a microphone that collects sound of an analog form, an amplifier circuit that amplifies the collected sound, an A/D converter circuit that samples the amplified sound and converts to a digital signal, a filter circuit that removes noise components from the converted digital signal, and the like.

The microphone 160 may be realized in a form of a sound sensor, and may be any method so long as it is a configuration that can collect sound.

The speaker 170 may be an element that outputs not only various audio data processed in the processor 120, but also various notification sounds, voice messages, or the like.

The camera 180 may be a configuration for capturing a still image or a moving image. The camera 180 may capture the still image at a specific time point, but may also capture the still image consecutively.

The camera 180 may capture an actual environment at a front direction of the electronic apparatus 100 by capturing the front direction of the electronic apparatus 100. The processor 120 may identify a region of interest from the captured image through the camera 180.

The camera 180 may include a lens, a shutter, an aperture, a solid-state imaging device, an Analog Front End (AFE), and a Timing Generator (TG). The shutter may be configured to adjust a time during which light reflected from a subject enters the camera 180, and the aperture may be configured to adjust an amount of light incident to the lens by mechanically increasing or decreasing a size of an opening part through which light enters. The solid-state imaging device may be configured to output, based on light reflected from the subject being accumulated as photo charge, an image by the photo charge as an electric signal. The TG may be configured to output a timing signal for reading out pixel data of the solid-state imaging device, and the AFE may be configured to digitalize the electric signal output from the solid-state imaging device by sampling.

The electronic apparatus 100 as described above may reduce manufacturing costs and power consumption by identifying the region of interest from the one image and comparing with the multimodal method. In addition, the electronic apparatus 100 may identify the region of interest by further using description information corresponding to one image for the identification function of the region of interest to be improved.

An operation of the electronic apparatus will be described in greater detail below through FIG. 4 to FIG. 10. In FIG. 4 to FIG. 10, separate embodiments will be described for convenience of description. However, the separate embodiments of FIG. 4 to FIG. 10 may be realized in any combined state.

Figure 4:
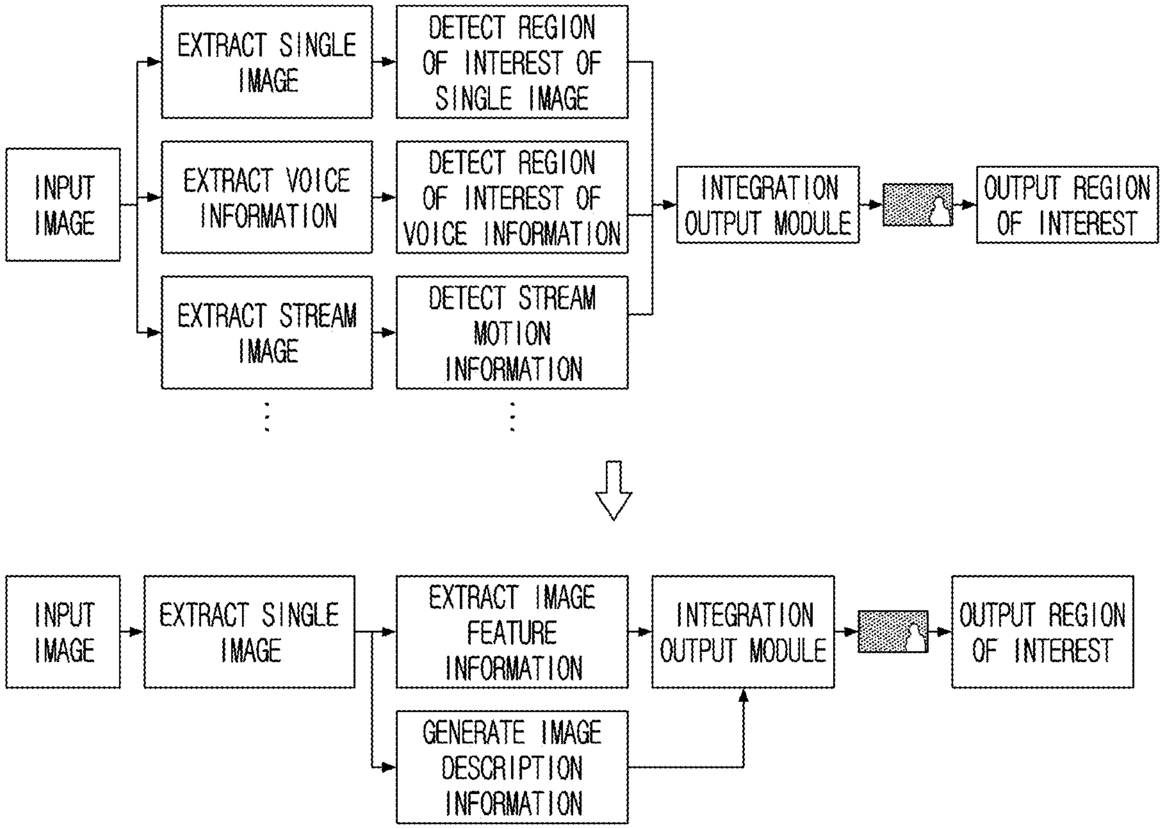
FIG. 4 is a diagram illustrating an operation and effect according one or more embodiments of the disclosure.

FIG. 4 is a diagram illustrating an operation and effect according one or more embodiments of the disclosure.

The upper end of FIG. 4 shows a multimodal method, and the multimodal method may extract a single image from an input image, extract voice information, and extract a stream image.

When a region of interest is detected from the single image, the region of interest is detected from the voice information, and motion information of stream is detected an integration output module may output the region of interest from the detected information.

In this case, memory capacity may be further required for comparing with a method of extracting a region of interest from a single image, extracting voice information, and storing stream image. That is, manufacturing cost may be increased. In addition, a processing delay and power consumption may increase according to an amount of computation increasing as computation for detecting the region of interest from the voice information and computation for detecting motion information from the stream image are added.

The lower end of FIG. 4 shows a method of the disclosure, and according to the disclosure, a single image may be extracted from the input image and downscaled. Thereby, when compared with the multimodal method, manufacturing cost in terms of hardware may be reduced because voice information is extracted or because there is no need to extract a stream image.

The processor 120 may generate description information (image description information) from a single image. The operation described above may be software processed. Alternatively, a separate hardware for a neural network computation such as the neural processing unit (NPU) may be provided, but the hardware may be mass produced without increasing the manufacturing costs significantly, and recently, with more devices basically including the NPU, there may be no further manufacturing cost generated.

The processor 120 may extract image feature information from a single image. The processor 120 may output a region of interest from the image feature information and image description information through the integration output module.

An operation of obtaining the image feature information and the image description information may be performed through the neural network computation, and may secure a fast computation rate when using a dedicated processor such as the NPU. In addition, because a computation for a single image is performed, power consumption may be reduced by comparing with the multimodal method that performs computation for a plurality of images.

Whereas, a performance that generates image description information from a single image and identifies the region of interest by comparing with an operation that simply detects the region of interest from the single image because the above is used in an operation identifying the region of interest may be further improved.

Figure 5:
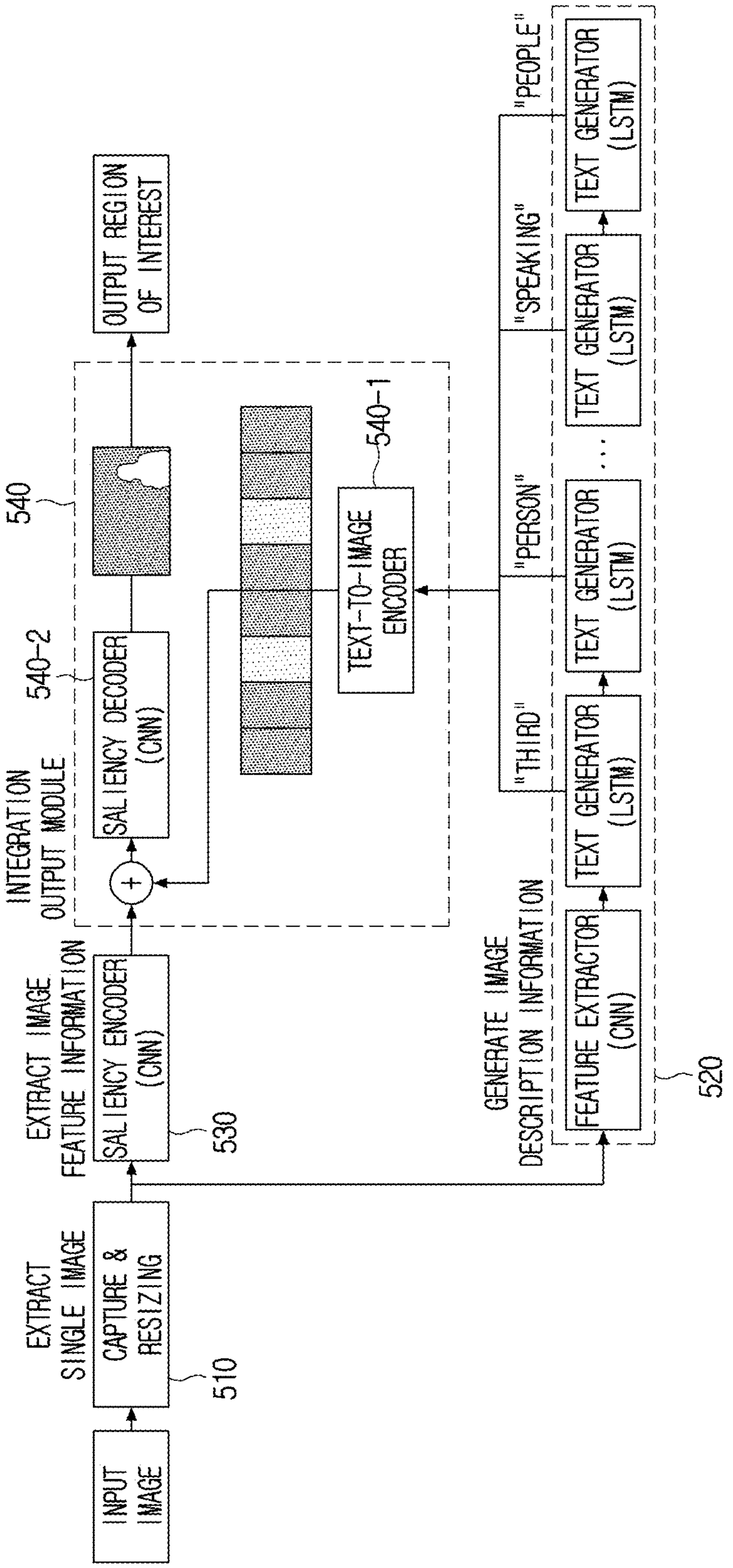
FIG. 5 is a diagram illustrating a detailed method of identifying a region of interest according to one or more embodiments of the disclosure.

FIG. 5 is a diagram illustrating a detailed method of identifying a region of interest according to one or more embodiments of the disclosure.

The processor 120 may extract a single image from an input image, and downscale the extracted image (510). For example, the processor 120 may capture a frame of the input image, and downscale a frame of 1920×1080 resolution to 320×240 resolution.

The processor 120 may generate description (image description) information from an image (520). For example, the processor 120 may obtain description information by inputting the image to the first network of the neural network model. Here, the first network may include the convolution network and the plurality of LSTM, a feature of the image may be extracted through the convolution network, and each of the plurality of LSTM may output, as a text generator, one word from the feature of the image.

The processor 120 may extract image feature information from an image (530). The processor 120 may generate an image from description information (540-1) by executing an integration output module (540), and obtain a black and white image that shows the region of interest from the image feature information and the imaged description information (540-2). For example, operation 530 and operation 540-2 of FIG. 5 may be realized with the first network of the neural network model in which operation 530 may be a saliency encoder, and operation 540-2 may be a saliency decoder. The saliency encoder may extract a feature in an image, and the saliency decoder may extract the black and while image showing the region of interest that corresponds to the image.

That is, the operation after the down scaling of the image may be an operation of the neural network model. In some embodiments, the neural network model includes weights. The weights are a portion of the information used to implement the first network and the second network. As shown in FIG. 5, the first network, in some embodiments, is a CNN followed by several LSTMs. The number of LSTMs may be adjusted to correspond a typical number of words needed to represent a scene in an image. The second network, in some embodiments, is a CNN implementing the saliency encoder 530 with an intermediate input into the saliency decoder 540-2 (implemented as a CNN).

The CNN 530, in some embodiments, is implemented with N1 layers, with N2 neurons in each layer. The CNN 540-2, in some embodiments, is implemented with N3 layers, with N4 neurons in each layer. The text-to-image encoder 540-1, in some embodiments, is implemented by a CNN with N5 layers with N6 neurons in each layer. The CNN portion of 520 is implemented with N7 layers with N8 neurons in each layer. An example LSTM portion of 520 is a recurrent neural network implemented with N9 nodes, and N10 memory blocks in a chain structure.

Figure 6:
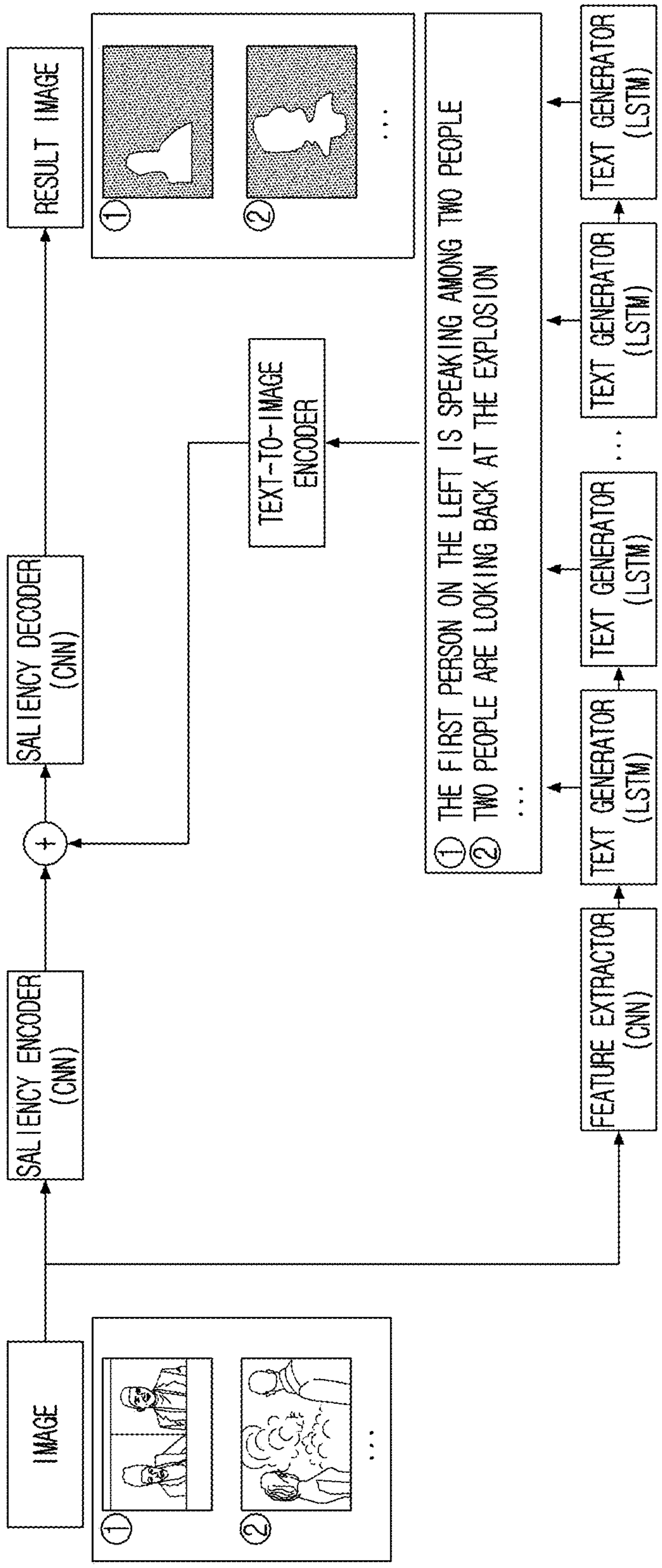
FIG. 6 is a diagram illustrating a learning method of a neural network model that identifies a region of interest according to one or more embodiments of the disclosure.

FIG. 6 is a diagram illustrating a learning method of a neural network model that identifies a region of interest according to one or more embodiments of the disclosure.

The neural network model may include a first network and a second network. The neural network model may be a model trained based on a plurality of sample images, a plurality of sample description information corresponding to the plurality of sample images, and a sample region of interest of the plurality of sample images.

The first network may be trained of a relationship of the plurality of sample description information for the plurality of sample images through the artificial intelligence algorithm, and the second network may be trained of a relationship of the plurality of sample images and the sample region of interest of the plurality of sample images for the plurality of sample description information through the artificial intelligence algorithm.

In addition, the first network and the second network may be simultaneously trained.

For example, as shown in FIG. 6, image ① which includes two people of which a person on the left side is a speaker may be a sample image with ① "The first person on the left is speaking among two people." being the sample description information corresponding to image ①, and black and white image ① of which only a form of the person on the left side is white and the remaining region is black being the sample region of interest corresponding to image ①. The first network may learn the relationship of image ① and ① "The first person on the left is speaking among two people," and the second network may learn the relationship of image ① and black and white image ① for information that imaged ① "The first person on the left is speaking among two people." A difference between correct answers of prediction description information output through the first network and each of prediction black and white images output through the second network may be defined as losses and learning may proceed in a direction toward which two losses are minimized.

Learning by the first network and the second network may be performed by repeating the operation described above through various sample learning data.

Figure 7:
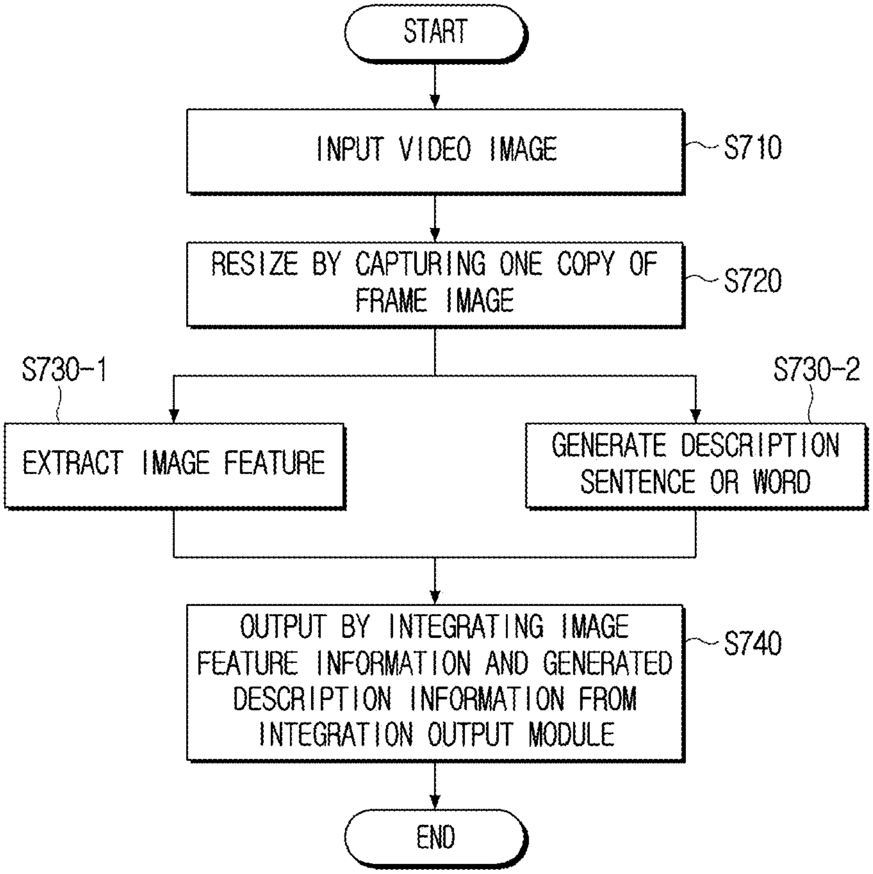
FIG. 7 is a flowchart illustrating a method of identifying a region of interest according to one or more embodiments of the disclosure.

FIG. 7 is a flowchart illustrating a method of identifying a region of interest according to one or more embodiments of the disclosure.

The processor 120 may receive input of a video image (S710). However, the above is not limited thereto, and the video image may be pre-stored in the memory 110 or captured through the camera 180 in real-time.

The processor 120 may capture a frame of the video image, and downscale the captured image (S720). However, the above is not limited thereto, and the processor 120 may obtain screen data for one from among a plurality of frames included in the video image from data corresponding to the video image.

The processor 120 may extract a feature from the downscaled image (S730-1), and obtain description information such as a description sentence or word from the downscaled image (S730-2).

The processor 120 may integrate the image feature information with the description information through the integration output module, and output an image showing the region of interest therefrom.

Figure 8:
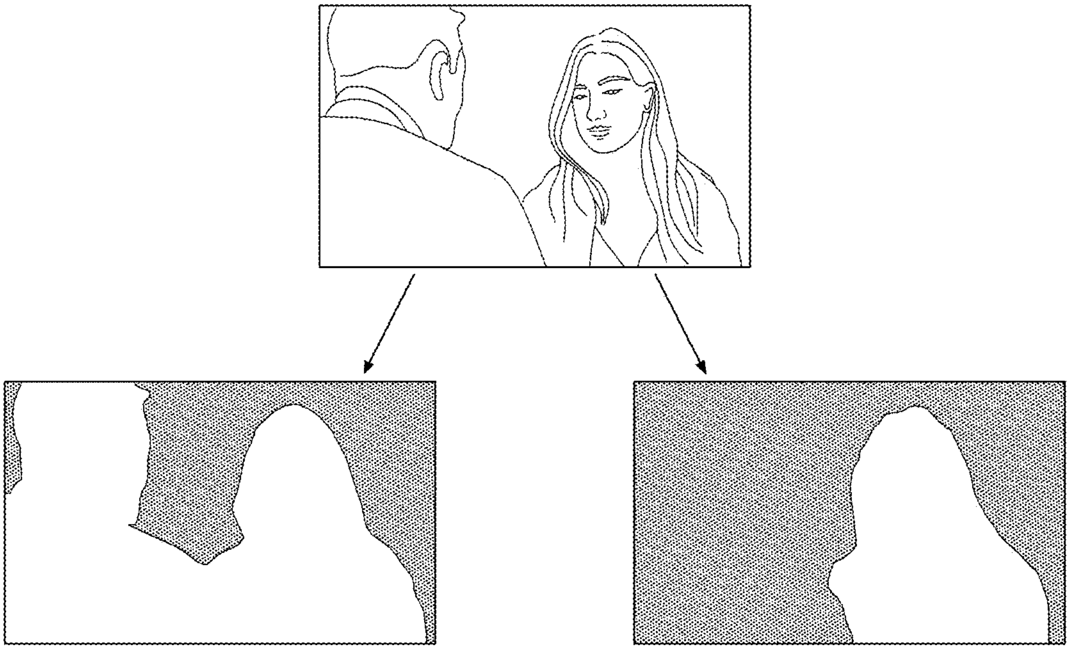
FIG. 8 to FIG. 10 are diagrams illustrating an effect according to one or more embodiments of the disclosure.
Figure 9:
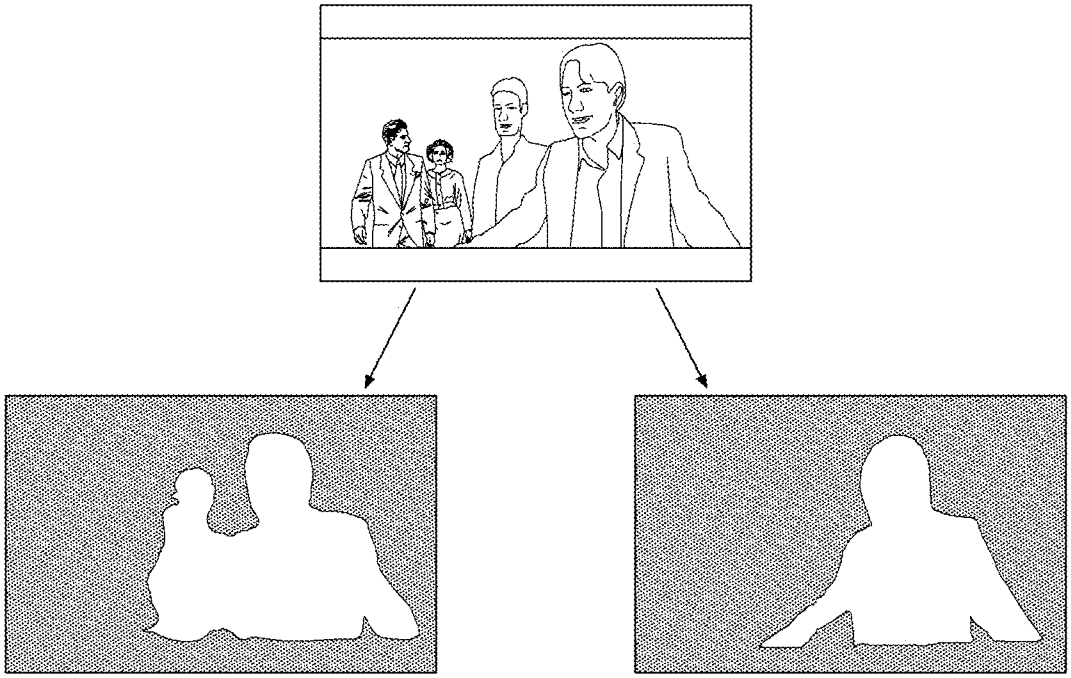
Figure 10:
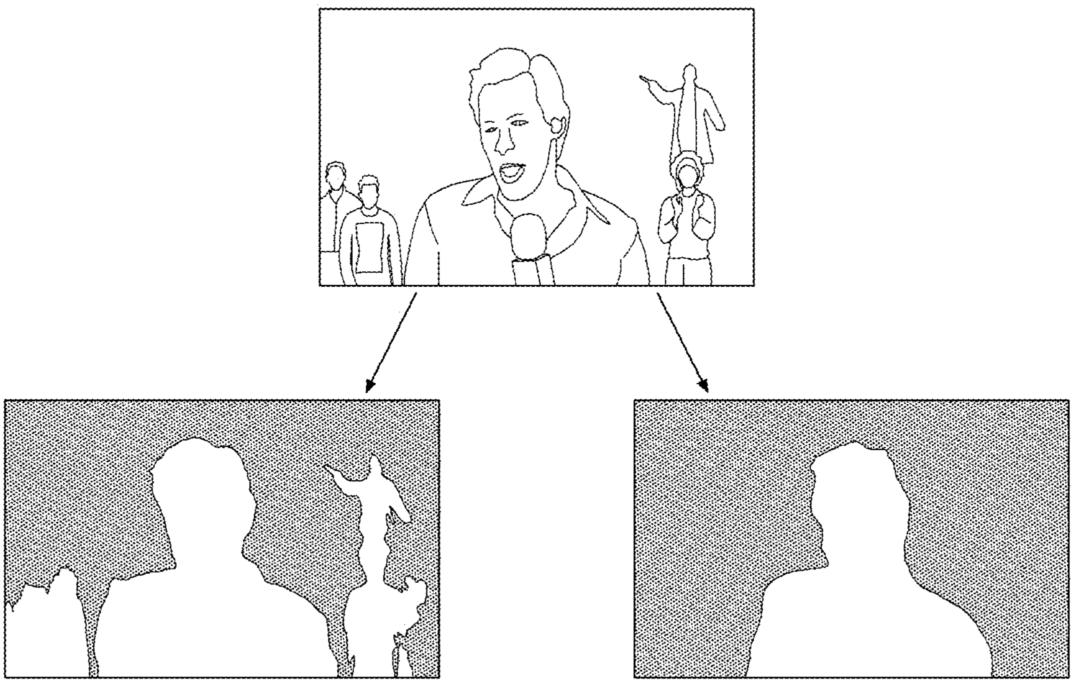

FIG. 8 to FIG. 10 are diagrams illustrating an effect according to one or more embodiments of the disclosure.

When a person on the right side from among two people is facing a front direction and a person of the left side is facing a rear direction as in an upper end of FIG. 8, the region of interest may be identified as in the left lower end of FIG. 8 if only feature information of a single image is used, but by additionally using the description information that only the person on the left side from among the two people is facing the front direction, the region of interest may be identified as in the right lower end of FIG. 8.

When a region occupied by about two people from among a plurality of people is big as in the upper end of FIG. 9, the region of interest may be identified as in the left lower end of FIG. 9 when only the feature information of the single image is used, but the region of interest may be identified as in the right lower end of FIG. 9 by additionally using the description information that the person in the left side from among the two people is the speaker.

If only a person in a middle from among a plurality of people is the speaker as in the upper end of FIG. 10, the region of interest including the plurality of people may be identified as in the left lower end of FIG. 10 if only the feature information of the single image is used, but by additionally using the description information that only the person in the middle is the speaker, the region of interest may be identified as in the right lower end of FIG. 10.

Figure 11:
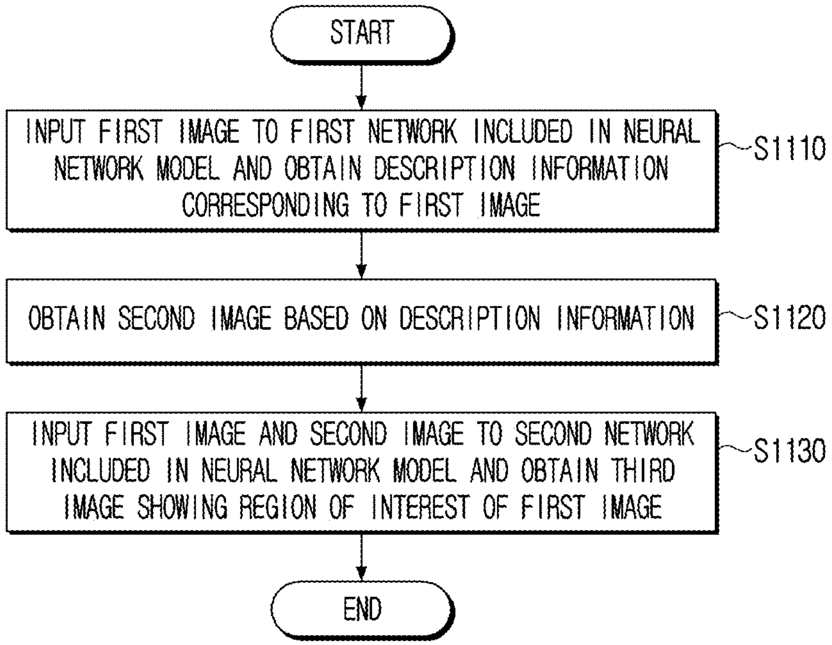
FIG. 11 is a flowchart illustrating a control method of an electronic apparatus according to one or more embodiments of the disclosure.

FIG. 11 is a flowchart illustrating a control method of an electronic apparatus according to one or more embodiments of the disclosure.

First, the description information corresponding to the first image may be obtained by inputting the first image to the first network included in the neural network model (S1110). Then, the second image may be obtained based on the description information (S1120). Then, the third image representing the region of interest of the first image may be obtained by inputting the first image and the second image to the second network included in the neural network model (S1130). Here, the neural network model may be a model trained based on a plurality of sample images, a plurality of sample description information corresponding to the plurality of sample images, and a sample region of interest of the plurality of sample images.

Here, the obtaining the third image (S1130) may include obtaining the third image by inputting the first image to an input layer of the second network, and inputting the second image to an intermediate layer of the second network.

The description information may include at least one word, and the obtaining the second image (S1120) may include obtaining the second image by converting each of the at least one word to a corresponding color. For example, in some embodiments, the processor 120 is configured to obtain the second image by converting each word of the at least one word to a corresponding color.

In addition, the method may further include obtaining the first image by downscaling the original image to a pre-set resolution or downscaling the original image to the pre-set scaling rate.

Here, a step of upscaling the third image to correspond to the resolution of the original image may be further included.

The third image may represent the region of interest of the first image in the first color, and the background region which is the remaining region excluding the region of interest of the first image in the second color, and the resolution of which may be the same as with the first image. For example, the third image depicts the first region of interest of the first image in a first color, and the third image depicts a background region in a second color, the background region is a remaining region excluding the first region of interest of the first image, and a resolution of the third image is the same as that of the first image.

In addition, the first network may be trained of the relationship of the plurality of sample description information for the plurality of sample images through the artificial intelligence algorithm, and the second network than be trained of the relationship of the plurality of sample images and the sample region of interest of the plurality of sample images for the plurality of sample description information through the artificial intelligence algorithm.

Here, the first network and the second network may be simultaneously trained.

The first network may include the convolution network and the plurality of LSTM, and the plurality of LSTM may output the description information. An LSTM may also be referred to as a long short term memory network.

In addition, the method may further include the identifying the remaining region excluding the region of interest from the first image as the background image and the image processing the region of interest and the background region differently.

For example, the control method may include obtaining first description information corresponding to a first image by inputting the first image to a first network comprised in a neural network model (S1110); obtaining a second image based on the first description information (S1120); and obtaining a third image showing a region of interest of the first image by inputting the first image and the second image to a second network comprised in the neural network model (S1130). In some embodiments, the processor 120 performs the logic flow of FIG. 11 by reading the weights of the neural network model from the memory 110; and implements the first network 520 and the second network (530 and 540-2) and the text to image encoder 540-1 using the weights of the neural network model.

According to the various embodiments of the disclosure as described above, the electronic apparatus may reduce the manufacturing cost and the power consumption by identifying the region of interest from one image and comparing with the multimodal method.

In addition, the electronic apparatus may identify the region of interest by further using the description information corresponding to one image and the identification performance of the region of interest may be improved.

According to one or more embodiments of the disclosure, the various embodiments described above may be realized with software including instructions stored in a machine-readable storage media (e.g., computer). The machine may call an instruction stored in the storage medium, and as a device operable according to the called instruction, may include an electronic apparatus (e.g., electronic apparatus (A)) according to the above-mentioned embodiments. Based on an instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

According to one or more embodiments, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be stored at least temporarily in the storage medium such as a server of a manufacturer, a server of an application store, or a memory of a relay server, or temporarily generated.

According to one or more embodiments of the disclosure, the various embodiments described above may be realized in a recordable medium which is readable by a computer or a device similar to the computer using software, hardware, or the combination of software and hardware. In some cases, embodiments described herein may be realized by the processor itself. According to a software implementation, embodiments such as the procedures and functions described herein may be realized with a separate software. The respective software may perform one or more functions and operations described herein.

The computer instructions for performing processing operations in a device according to the various embodiments described above may be stored in a non-transitory computer-readable medium. The computer instructions stored in this non-transitory computer-readable medium may cause a specific device to perform a processing operation from a device according to the above-described various embodiments when executed by a processor of the specific device. The non-transitory computer readable medium may refer to a medium that stores data semi-permanently rather than storing data for a very short time, such as a register, a cache, a memory, or the like, and is readable by a device. Specific examples of the non-transitory computer readable medium may include, for example, and without limitation, a compact disc (CD), a digital versatile disc (DVD), a hard disc, a Blu-ray disc, a USB, a memory card, a ROM, and the like.

In addition, respective elements (e.g., a module or a program) according to various embodiments described above may be formed of a single entity or a plurality of entities, and some sub-elements of the above-mentioned sub-elements may be omitted or other sub-elements may be further included in the various embodiments. Alternatively or additionally, some elements (e.g., modules or programs) may be integrated into one entity to perform the same or similar functions performed by the respective corresponding elements prior to integration. Operations performed by a module, a program, or other element, in accordance with the various embodiments, may be executed sequentially, in parallel, repetitively, or in a heuristically manner, or at least some operations may be performed in a different order, omitted, or a different operation may be added.

While the disclosure has been illustrated and described with reference to various example embodiments thereof, it will be understood that the various example embodiments are intended to be illustrative, not limiting. It will be understood by those skilled in the art that various changes in form and details may be made therein without departing from the true spirit and full scope of the disclosure, including the appended claims and their equivalents.

What is claimed is:

1. An electronic apparatus, comprising:

a memory configured to store a neural network model comprising a first network and a second network, wherein the neural network model comprises weights; and at least one processor connected to the memory and configured to control the electronic apparatus, wherein the at least one processor is configured to:

obtain first description information corresponding to a first image by inputting the first image to the first network using the weights, obtain a second image based on the first description information, and obtain a third image representing a first region of interest of the first image by inputting the first image and the second image to the second network using the weights, wherein the weights of the neural network model are trained based on: i) a plurality of sample images, ii) a plurality of sample description information corresponding to the plurality of sample images, and iii) a sample region of interest for each sample image of the plurality of sample images, and wherein the first description information comprises at least one word and the at least one processor is further configured to obtain the second image by converting each word of the at least one word to a corresponding color.

2. The electronic apparatus of claim 1, wherein the at least one processor is further configured to:

obtain the third image by inputting the first image to an input layer of the second network using the weights, and input the second image to an intermediate layer of the second network using the weights.

3. The electronic apparatus of claim 1, wherein the at least one processor is further configured to:

obtain the first image by downscaling an original image to a pre-set resolution, or downscale the original image to a pre-set scaling rate.

4. The electronic apparatus of claim 3, wherein the at least one processor is further configured to upscale the third image to correspond to a resolution of the original image.

5. The electronic apparatus of claim 1, wherein the third image depicts the first region of interest of the first image in a first color, and the third image depicts a background region in a second color, wherein the background region is a remaining region excluding the first region of interest of the first image, and a resolution of the third image is the same as that of the first image.

6. The electronic apparatus of claim 1, wherein the first network is configured so as to be trained of a first relationship of the plurality of sample description information for the plurality of sample images through an artificial intelligence algorithm, and the second network is configured so as to be trained, through the artificial intelligence algorithm, of a second relationship of the plurality of sample images and the sample region of interest for the each sample image of the plurality of sample images, wherein each sample image corresponds to a sample description information of the plurality of sample description information.

7. The electronic apparatus of claim 6, wherein the first network and the second network are simultaneously trained.

8. The electronic apparatus of claim 1, wherein the first network comprises a convolution network and a plurality of long short-term memory networks (LSTMs), and the plurality of LSTMs are configured to output the first description information.

9. The electronic apparatus of claim 1, wherein the at least one processor is further configured to:

identify a remaining region excluding the first region of interest from the first image as a background region, and image process the first region of interest and the background region differently.

10. The electronic apparatus of claim 1, wherein the at least one processor is further configured to:

read the weights of the neural network model from the memory; and implement the first network and the second network in the at least one processor using the weights.

11. The electronic apparatus of claim 1, wherein the at least one processor is further configured to:

identify a remaining region excluding the first region of interest from the first image as a background region, and lower a brightness of the background region and maintain the brightness of the first region of interest.

12. A control method of an electronic apparatus, the control method comprising:

obtaining first description information corresponding to a first image by inputting the first image to a first network comprised in a neural network model;

obtaining a second image based on the first description information; and obtaining a third image showing a region of interest of the first image by inputting the first image and the second image to a second network comprised in the neural network model, wherein the neural network model is a model trained based on a plurality of sample images, a plurality of sample description information corresponding to the plurality of sample images, and a sample region of interest for each sample image of the plurality of sample images, and wherein the first description information comprises at least one word and the obtaining the second image comprises converting each word of the at least one word to a corresponding color.

13. The control method of claim 12, wherein the obtaining the third image comprises:

obtaining the third image by inputting the first image in an input layer of the second network, and inputting the second image to an intermediate layer of the second network.

14. The control method of claim 12, further comprising:

obtaining the first image by downscaling an original image to a pre-set resolution, or downscaling the original image to a pre-set scaling rate.

15. The control method of claim 14, further comprising upscaling the third image to correspond to a resolution of the original image.

16. The control method of claim 15, wherein the resolution of the first image is a first resolution of 320 by 240 after the downscaling, and the third image has a full high definition (FHD) resolution after the upscaling, wherein the original image has an FHD resolution.

17. The control method of claim 14, wherein the pre-set resolution is 320 by 240.

18. The control method of claim 17, wherein the downscaling is configured to reduce a power consumption by using the first image, wherein the first image is of low resolution.

19. The control method of claim 14, wherein the downscaling maintains a horizontal width of the original image and a vertical height of the original image.

20. The control method of claim 12, further comprising:

identifying a remaining region excluding the first region of interest from the first image as a background region, and lowering a brightness of the background region and maintaining the brightness of the first region of interest.

* * * * *